United States Patent [19]

Mongiello et al.

[11] Patent Number: 4,661,361

[45] Date of Patent: Apr. 28, 1987

[54] METHOD OF MAKING A PIZZA

[76] Inventors: Anthony T. Mongiello, 1663-84th St., Brooklyn, N.Y. 11214; Lawrence A. Mongiello, Sr., 706 Greenwood Ave., Brooklyn, N.Y. 11218; Angelo A. Mongiello, Sr., 1655 84th St., Brooklyn, N.Y. 11214

[21] Appl. No.: 624,190

[22] Filed: Jun. 25, 1984

[51] Int. Cl.⁴ ............................................. A21D 8/02
[52] U.S. Cl. .................................. 426/283; 426/297; 426/302; 426/502; 426/94
[58] Field of Search ................. 426/94, 283, 138, 297, 426/502, 512, 302; 249/115; 425/383

[56] References Cited

U.S. PATENT DOCUMENTS

| | | | |
|---|---|---|---|
| D. 110,341 | 6/1938 | Carter et al. | D1/11 |
| D. 234,233 | 2/1975 | Silvestri | D1/11 |
| 1,174,826 | 3/1916 | Chapman | 426/138 |
| 2,668,117 | 2/1954 | Bucci | 426/94 |
| 3,026,822 | 3/1962 | Gatti | 426/94 |
| 3,615,678 | 10/1971 | Tangel | 426/95 |
| 3,892,868 | 6/1975 | Klingler | 426/94 |
| 4,020,184 | 4/1977 | Chesner | 426/19 |
| 4,112,127 | 9/1978 | Popeil | 426/502 |
| 4,170,659 | 10/1979 | Totino et al. | 426/95 |
| 4,283,431 | 8/1981 | Giordano | 426/296 |
| 4,313,961 | 2/1982 | Tobia | 426/19 |
| 4,400,404 | 8/1983 | Persi | 426/549 |

OTHER PUBLICATIONS

DeVecchio, Italian Cookbook, Lane Books, Calif., 1975, p. 38.
Tighe, Woman's Day Encyclopedia of Cookery, Fawcett Pub., Inc., N.Y., 1966, p. 1879.

Primary Examiner—Robert Yoncoski
Attorney, Agent, or Firm—Pennie & Edmonds

[57] ABSTRACT

A pizza shell and a method for forming pizza shells. The pizza shell comprises a dough base, a plurality of closed pockets uniformly distributed about at least a portion of the base, and a plurality of food portions held within those closed pockets. To form the pizza shell, a flat dough base is formed, a plurality of food portions are placed on the dough base, the food portions are covered, and a plurality of closed pockets are formed to enclose each food portion within a separate closed pocket. The pizza shell is then used in a conventional manner to make a pizza pie.

15 Claims, 11 Drawing Figures

METHOD OF MAKING A PIZZA

BACKGROUND OF THE INVENTION

This invention generally relates to pizzas, and more specifically to pizza shells and to methods of making pizza shells.

The conventional pizza pie comprises a dough base formed into a generally flat, circular or rectangular shell and covered with a sauce and a topping. Normally, the dough is a bread dough, the sauce is a tomato sauce, and the topping includes cheese and often also includes other foods such as pieces of pepperoni or anchovies. An outer edge crust is formed around the perimeter of the dough base to hold the sauce and the topping on the base as the pie is made. The pie is then baked in an oven, cut, and eaten.

Pizza is a very popular food. Nevertheless, the conventional pizza pie does have several disadvantages. For example, many people do not like to eat the baked outer crust of a pizza and often they simply throw that crust away. In addition, usually only a relatively limited number of food products are used with pizzas. Another disadvantage of pizzas of the general type described above is that the amount of the topping provided with individual pizzas normally is also within a relatively narrow range. Pizzas do not have the same flexibility as sandwiches have, for example, with respect to the range of different food products or the quantity of food products that are normally used with pizzas.

SUMMARY OF THE INVENTION

The present invention is a pizza shell and a method of making a pizza shell. The shell comprises a dough base, a plurality of closed pockets uniformly distributed about at least a portion of the base, and a plurality of food portions held within those closed pockets. The shell is made by forming a generally flat dough base, placing a plurality of food portions on that base, covering the food portions, and forming a plurality of closed pockets to enclose each food portion within a separate closed pocket.

An extremely wide range of foods such as meats, meatballs, creams, fruit fillings, eggs, or vegetables may be located in the closed pockets. Thus, with the present invention it is very simple to provide a pizza that satisfies an appetite or a hunger for a plurality of different types of foods. In addition, the size of the closed pockets and the amount of food located in individual pockets may vary over a very wide range. As a result, pizzas, or even a single pizza, employing the present invention may be used to satisfy widely varying appetites. Moreover, because the closed pockets are uniformly distributed about at least a portion of the base of the pizza shell, those pockets facilitate cutting that portion into a plurality of substantially equally sized pieces with one pocket on each piece.

A DETAILED DESCRIPTION OF THE PREFERRED EMBODIMENTS

Figure 1:
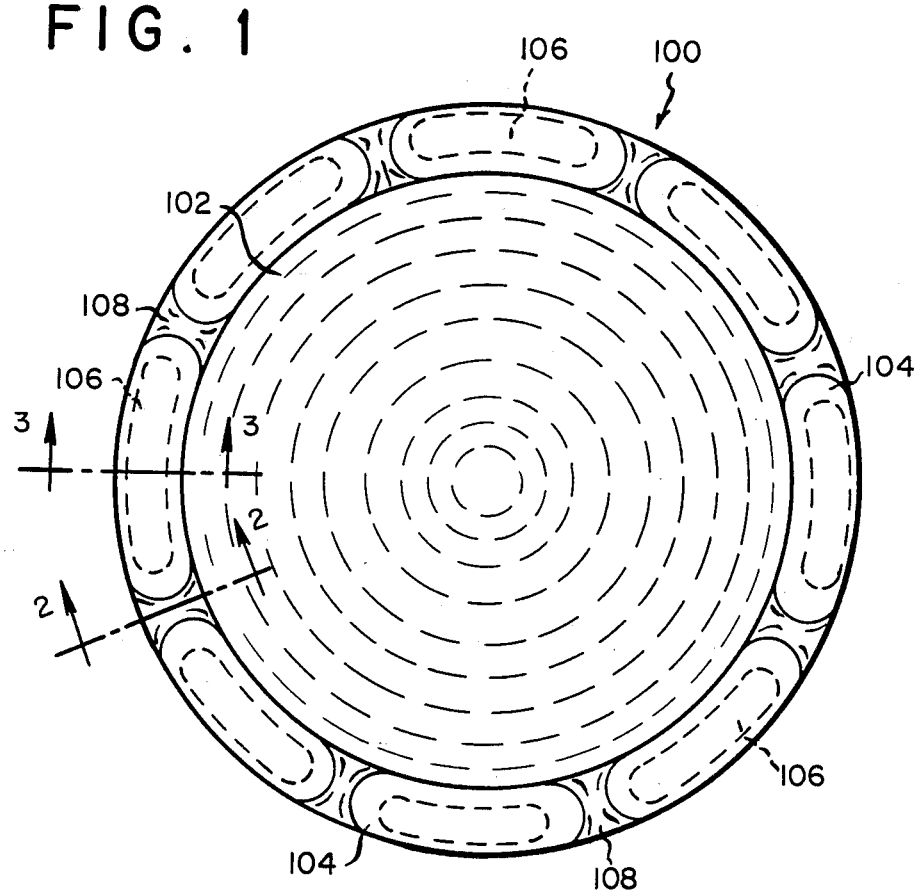
FIG. 1 is a top view of a pizza shell in accordance with this invention.
Figure 2:
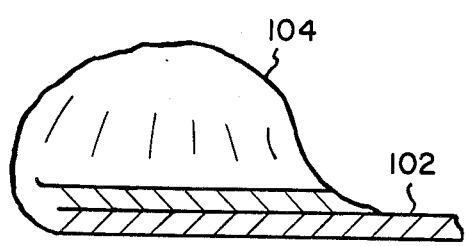
FIGS. 2 and 3 are sectional views taken along lines II—II and III—III of FIG. 1 respectively.
Figure 3:
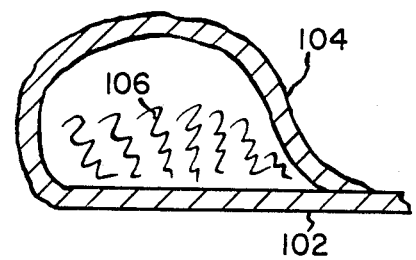

FIGS. 1, 2 and 3 show pizza shell 100 generally comprising dough base 102, a plurality of closed pockets 104, and a plurality of food portions 106. Any suitable dough, for instance a conventional bread dough, may be used as base 102. Base 102 is generally flat, and as shown in FIG. 1, the base has a generally circular shape. Pockets 104 are uniformly distributed over at least a portion of base 102 so that this portion of the base may be cut into a plurality of equally sized pieces with each such piece having one closed pocket thereon.

With the embodiment of the invention shown in FIG. 1, the means that form pockets 104 extend substantially continuously around the entire perimeter of base 102. In this way, pockets 104 also form an outer raised rim or crust of pizza shell 100 to hold sauce and toppings on the inside surface of base 102 during preparation and cooking of a pizza pie having shell 100. Alternately, it should be noted, the means that form pockets 104 may extend along only a portion of the perimeter of base 102, for example a half or a quarter of that perimeter. In both cases, preferably the means that form pockets 104, first, has a length substantially longer than its width, and second, longitudinally extends along the perimeter of base 102.

Food portions 106 include foods different from dough base 102 and are held within pockets 106. An extremely wide range of foods may be located in pockets 104. For instance, food portions 106 may include cheeses, creams, fruit fillings, eggs, vegetables, or meats such as pepperoni, sausage, or meatballs. The different food portions 106 of a pizza shell 100 may consist of different foods. For instance, one food portion of a particular pizza shell 100 may consist of eggs, while another food portion of the same pizza shell may consist of meatballs. Moreover, the size of pockets 104 and the amount of food in individual pockets may also vary widely, even on the same pizza shell. For example, a single pizza shell 100 may be formed with one large pocket having a large amount of food, such as four or five meatballs, and with one small pocket having a much smaller amount of food, such as one meatball or a half a meatball. Thus, the present invention provides an individual with a very high degree of flexibility to prepare a pizza pie that will satisfy a number of appetites for different types and quantities of food.

Figure 4:
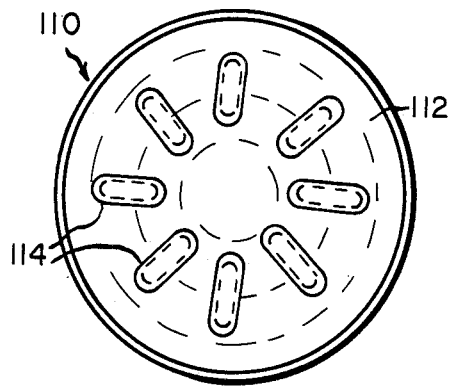
FIGS. 4, 5 and 6 are top views of three alternate embodiments of the present invention.
Figure 6:
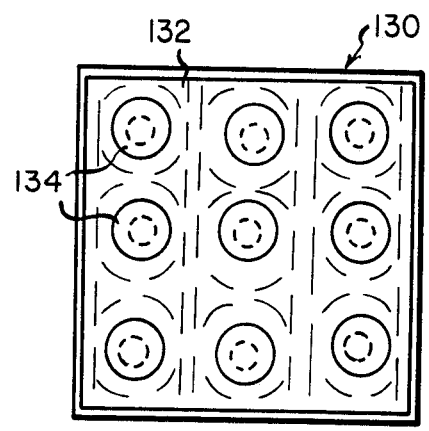
Figure 5:
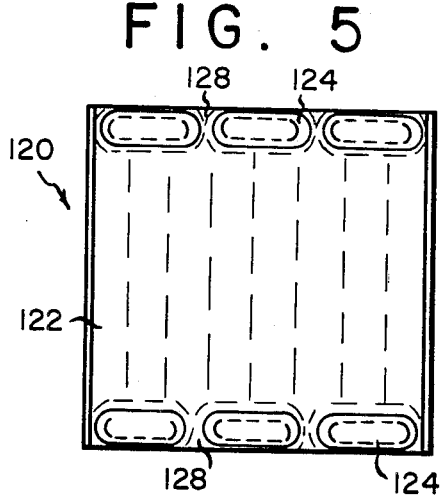

It should be noted that pizza shells in accordance with the present invention may include bases with shapes other than as shown in FIG. 1, and that the closed pockets of the shells may be positioned about or over the base in a number of different patterns. For example, FIG. 4 shows pizza shell 110 also having a generally flat, round base 112 but where closed pockets 114 are located between the circumference and center of the base, substantially equally spaced apart in an annular direction. FIG. 5 illustrates pizza shell 120 having a generally rectangular or square dough base 122, with a plurality of closed pockets 124 extending along opposite edges of the base. FIG. 6 illustrates pizza shell 130 also having a generally rectangular or square base 132, and a plurality of closed pockets 134 uniformly distributed over the surface area of that base.

One particular advantage of the pizza shells shown in FIGS. 1 and 5 is that those shells advantageously employ a part of the shell that is often simply discarded—the outer peripheral crust—to form the pizza pockets and thereby to increase the taste and appeal of pizza pies made from those shells.

With all the preferred embodiments of the pizza shells discussed above, the ends of the pizza pockets are pinched downward to the bases of the shells. These pinched ends of the pockets facilitate cutting the pizza shells into a plurality of equally sized pieces, by providing a visual guide as to where the pizza shells should be cut to accomplish this. This feature of the present invention is especially pronounced with the embodiments of the pizza shells illustrated in FIGS. 1 and 5.

In particular, with pizza shell 100 shown in FIG. 1, the means that forms pockets 104 also forms pocket ends 108, which are substantially equally spaced apart along the perimeter of base 102, between each adjacent pair of pockets 104. By cutting pizza shell 100 along radii extending through pocket ends 108, the pizza shell can be cut into eight equally sized pieces, with each piece having one closed pocket thereon. As will be appreciated by those knowledgeable in the art, if the means that form pockets 104 extends along only a portion of the perimeter of base 102, pocket ends 108 may be substantially equally spaced apart along that portion of the perimeter of the base, and thus help to cut at least a part of shell 100 into a plurality of equally sized pieces.

With reference to FIG. 5, the means that forms pockets 124 also forms pocket ends 128. A first group of pocket ends are substantially equally spaced apart along a first edge of base 122, between adjacent pairs of pockets 124 on that edge of the base; and a second group of pocket ends are substantially equally spaced apart along a second, opposite edge of base 122, between adjacent pairs of pockets 124 on that edge of the base. By cutting pizza shell 120 along lines extending between opposing ends of opposite pockets 124, pizza shell 120 is divided into three sections. Then by cutting each of these sections in half across the width of those sections, pizza shell 120 is cut into six equally sized pieces, with each piece having one closed pocket 124 thereon. Cutting the pizza shells 100 and 120 into a plurality of pieces without cutting through the interior of pockets 104 or 124 insures that any food or filling in those pockets does not accidentally spill from those pockets as the individual pizza pieces are cut and handled.

Generally, pizza shell 100 is made by forming a flat dough base 102, placing a plurality of food portions 106 on this base, covering the food portions, and then forming closed pockets 104 to enclose those food portions. This general method may be accomplished in a number of specific ways.

Figure 7:
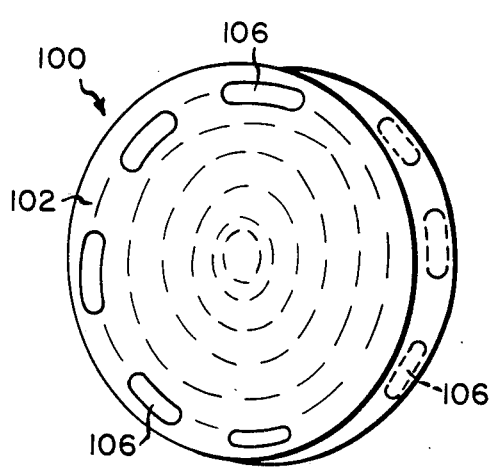
FIGS. 7 and 8 show the pizza shells of FIGS. 1 and 4 respectively during formation of those shells.

For example, with reference to FIG. 7, food portions 106 may be located adjacent and slightly spaced from the outside perimeter of base 102, and then an outer peripheral strip of the dough base may be folded inward and over the food portions, toward the center of the base. The inside circumferential edge of this strip and portions of the strip between adjacent food portions are then pinched to base 102 to form closed pockets enclosing food portions 106.

Figure 8:
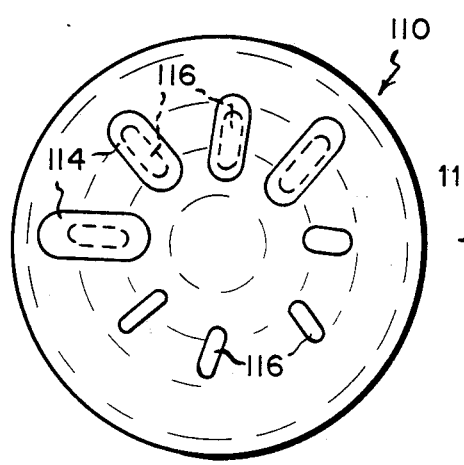

As an alternate method, with reference now to FIG. 8, the food portions are placed on the dough base, and then one or more pieces of dough, initially separate from the dough base, are placed over those food portions and outside edges of those cover pieces are pinched to the dough base to form a plurality of closed pockets. This method is especially well suited to form the pizza shells having closed pockets that are not closely located adjacent an outside edge of the dough base, for example pizza shell 110 shown in FIG. 4 or pizza shell 130 shown in FIG. 6.

Figure 9:
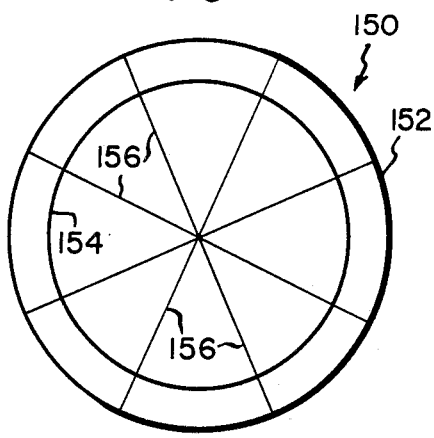

With both of the above-described methods, a pinching mechanism comprising an appropriately shaped grid of rods or bars may be used to pinch to the dough base the material that covers the food portions. One such framework 150, specifically designed to help make pizza shell 100 of FIG. 1, is shown in FIG. 9. Framework 150 comprises outer ring 152, inner ring 154, and a plurality of diametrically extending bars or rods 156. Outer ring has a diameter substantially equal to the outer diameter of pizza shell 100, and inner ring 152 has a diameter substantially equal to the diameter of the circle formed by the inside perimeter of pockets 104. Rods 154 extend along radii of the circles formed by rings 152 and 154 and are angularly equally spaced around those circles. In use, after food portions 106 are covered with material, framework 150 is pressed onto shell 100 so that bars 156 pinch to base 102 areas of that food cover material that are between adjacent pairs of food portions 106. With modifications well within the purview of those of ordinary skill in the art, alternate frameworks may be designed for use with other pizza shells constructed in accordance with this invention.

Preferably, it should be observed, the food portions of the pizza shells are covered with the same dough that is used to form the base of those shells. However, a dough having a consistency or texture different from the consistency and texture of the dough base, or having additional food materials mixed in the dough base, may be used to cover the food portions. Also, a plurality of closed pockets, with food portions enclosed therein, may be formed separately from the dough base and then placed thereon. Depending on the specific food or foods comprising the food portions, it may further be desirable to form small vent openings in the sides of the closed pockets, for example by punching those sides with the prongs of a fork, to allow steam or other vapors to escape from those closed pockets during baking of the pizza shell.

Figure 10:
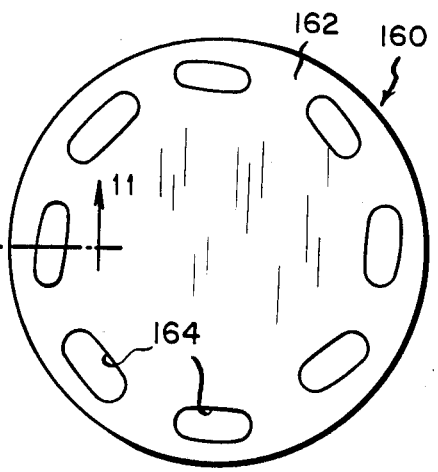
FIG. 9 shows a pinching mechanism and FIG. 10 shows a template that are used to make the pizza shell shown in FIG. 1.
Figure 11:
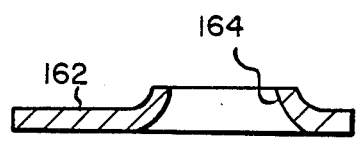
FIG. 11 is a sectional view taken along line XI—XI of FIG. 10.

Moreover, with both of the specific methods disclosed above, a template may be used to locate the food portions of the pizza shells in the preferred position. FIGS. 10 and 11 show one template 160 that may be used in the practice of this invention, and that, in particular, is used to make pizza shell 100 of FIG. 1. Template 160 comprises a substantially flat metal plate 162 having a plurality of openings 164 formed therein. In use, template 160 is placed on dough base 102 after that base has been formed into a flat shape. Then food portions 106 are placed on the dough base, through openings 164. As shown in FIG. 11, the edges of openings 164 may be turned up to help form and hold food portions 106 in a small lump or pile on dough base 102. As will be apparent to those skilled in the art, template 160 is removed prior to covering food portions 106.

Once formed, the pizza shells described above may be used to make pizza pies in a conventional manner. That is, a tomato sauce is poured or ladled onto the base of the shell and then covered or sprinkled with cheese. Additional foods such as sausage or pepperoni may be placed on the shell. Then the pizza pie is baked in a conventional manner.

While it is apparent that the invention disclosed herein is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

We claim:

1. A method of making a pizza comprising the steps of:
   (a) forming a generally flat dough base;
   (b) placing a plurality of separated individual food portions on the dough base such that, when the dough base is cut into substantially equally sized portions, each individual food portion is located upon a portion of each piece;
   (c) covering each food portion with an unbaked dough section of sufficient dimensions to cover said food portion thereby forming a separate closed pocket about each food portion;
   (d) covering the portions of the dough base which are not covered by said closed pockets with a layer of tomato sauce and cheese to form an unbaked pizza product; and
   (e) baking the unbaked product to obtain a pizza.

2. A method according to claim 1 wherein the placing step includes the step of uniformly locating the individual food portions upon the dough base.

3. A method according to claim 1 wherein:
   (a) the placing step further includes the step of locating the individual food portions adjacent an outside perimeter of the dough base;
   (b) the covering step includes the step of folding an outside peripheral strip of the dough base over the food portions; and
   (c) the step of forming a plurality of closed pockets includes the steps of
      (i) pinching an edge of the peripheral strip to the dough base, and
      (ii) pinching to the dough base areas of the peripheral strip between the food portions.

4. A method according to claim 1 wherein:
   (a) the covering step includes the step of covering the food portions with unbaked dough sections which are separate from the dough base; and
   (b) the step of forming a plurality of closed pockets includes the step of pinching areas of the dough sections to the dough base.

5. A method according to claim 4 wherein the dough sections comprise a single continuous strip of dough.

6. A method according to claim 4 wherein the dough sections comprise a plurality of separate pieces of dough.

7. A method according to claim 1 wherein the placing step includes the steps of:
   (a) placing template means having a plurality of openings on the dough base; and
   (b) placing the individual food portions on the dough base through the template openings.

8. A method according to claim 7 wherein the template openings are uniformly distributed about at least a portion of the template.

9. A method according to claim 1 wherein the covering step further comprises the steps of placing a pinching apparatus having a plurality of bars forming a framework upon said dough base; and pressing the pinching apparatus onto the dough sections covering the food portions to join the dough sections to the dough base.

10. A method according to claim 1 wherein the layer of tomato sauce and cheese further comprises a topping.

11. A method of making a pizza comprising the steps of:
    (a) forming a generally flat dough base;
    (b) forming a plurality of closed pockets each pocket enclosing a portion of food;
    (c) placing the closed pockets on portions of the dough base;
    (d) covering portions of the dough base which are not covered by said closed pockets with a layer of tomato sauce and cheese to form an unbaked pizza product; and
    (e) baking the unbaked product to obtain a pizza.

12. A method according to claim 11 wherein the placing step includes the step of uniformly distributing the pockets about at least a portion of the base.

13. A method according to claim 11 wherein the layer of tomato sauce and cheese further comprises a topping.

14. A method of making a pizza product comprising the steps of:
    (a) forming a generally flat dough base;
    (b) placing template means having a plurality of openings upon the dough base;
    (c) placing individual food portions upon the dough base through the template openings;
    (d) removing the template means;
    (e) forming a plurality of closed pockets around each individual food portion upon the dough base with dough; and
    (f) covering the areas on the dough base which are not covered by the closed pockets with a layer comprising tomato sauce and cheese to form an unbaked pizza product.

15. The method of claim 14 further comprising baking the unbaked pizza product to obtain a pizza.

* * * * *